(12) United States Patent
Hsu et al.

(10) Patent No.: US 8,913,656 B2
(45) Date of Patent: Dec. 16, 2014

(54) METHOD AND APPARATUS FOR IN-LOOP FILTERING

(71) Applicant: Mediatek Inc., Hsinchu (TW)

(72) Inventors: Chih-Wei Hsu, Taipei (TW); Yu-Wen Huang, Taipei (TW)

(73) Assignee: Mediatek Inc., Hsinchu (TW)

( * ) Notice: Subject to any disclaimer, the term of this patent is extended or adjusted under 35 U.S.C. 154(b) by 298 days.

(21) Appl. No.: 13/633,162

(22) Filed: Oct. 2, 2012

(65) Prior Publication Data

US 2013/0094568 A1    Apr. 18, 2013

Related U.S. Application Data

(60) Provisional application No. 61/547,273, filed on Oct. 14, 2011.

(51) Int. Cl.
| | |
|---|---|
| *H04N 7/26* | (2006.01) |
| *H04N 19/86* | (2014.01) |
| *H04N 19/423* | (2014.01) |
| *H04N 19/82* | (2014.01) |
| *H04N 7/12* | (2006.01) |

(52) U.S. Cl.
CPC ... *H04N 19/00909* (2013.01); *H04N 19/00484* (2013.01); *H04N 19/00896* (2013.01)
USPC ........................................................ 375/240

(58) Field of Classification Search
USPC .................................................. 375/240.02
See application file for complete search history.

(56) References Cited

U.S. PATENT DOCUMENTS

| | | | | |
|---|---|---|---|---|
| 8,325,799 | B2 * | 12/2012 | Chono et al. ............. | 375/240.03 |
| 8,494,062 | B2 * | 7/2013 | Kuo ......................... | 375/240.29 |
| 2010/0128778 | A1 * | 5/2010 | Ji et al. ..................... | 375/240.2 |
| 2010/0329361 | A1 * | 12/2010 | Choi et al. ................ | 375/240.29 |
| 2010/0329362 | A1 * | 12/2010 | Choi et al. ................ | 375/240.29 |
| 2011/0249747 | A1 * | 10/2011 | Endo ......................... | 375/240.16 |
| 2011/0280308 | A1 * | 11/2011 | Oishi et al. ............... | 375/240.16 |
| 2012/0082241 | A1 * | 4/2012 | Tsai et al. ................. | 375/240.25 |
| 2012/0257702 | A1 * | 10/2012 | Narroschke et al. .. | 375/E07.027 |
| 2012/0294353 | A1 * | 11/2012 | Fu et al. .................... | 375/240.02 |
| 2013/0114682 | A1 * | 5/2013 | Zhao et al. ............... | 375/240.03 |
| 2013/0188744 | A1 * | 7/2013 | Van der Auwera et al. ........................ | 375/240.29 |
| 2013/0215959 | A1 * | 8/2013 | Chen et al. ................ | 375/240.02 |
| 2013/0315312 | A1 * | 11/2013 | Amano et al. ............ | 375/240.16 |
| 2013/0329795 | A1 * | 12/2013 | Tourapis et al. .......... | 375/240.12 |
| 2014/0233649 | A1 * | 8/2014 | Cheng et al. .............. | 375/240.16 |

* cited by examiner

*Primary Examiner* — Sath V Perungavoor
*Assistant Examiner* — Howard D Brown, Jr.
(74) *Attorney, Agent, or Firm* — Blairtech Solution LLC

(57) ABSTRACT

A method and apparatus for in-loop processing of reconstructed video are disclosed. The reconstructed video data is partitioned into image units. The image unit corresponds to a Largest Coding Unit (LCU), a slice, or a tile. Horizontal deblocking is applied to the reconstructed video data across vertical image-unit boundaries and then vertical deblocking operates on n pixels of horizontal-deblocked video data on each side of horizontal image-unit boundaries. According to various embodiments of the present invention, the horizontal deblocking is applied to at least one of said n reconstructed lines to generate at least a horizontal-deblocked line for line $p_{n-1}$. Sample adaptive offset (SAO) processing is then applied to at least a horizontal-deblocked line for line $p_n$ based on the horizontal-deblocked line for line $p_{n-1}$. The above steps are performed before a neighboring image unit below the current image unit arrives.

20 Claims, 8 Drawing Sheets

US 8,913,656 B2

METHOD AND APPARATUS FOR IN-LOOP FILTERING

CROSS REFERENCE TO RELATED APPLICATIONS

The present invention claims priority to U.S. Provisional Patent Application, Ser. No. 61/547,273, filed on Oct. 14, 2011, entitled "Implementation of In-Loop Filtering". The U.S. Provisional Patent Application is hereby incorporated by reference in its entirety.

FIELD OF THE INVENTION

The present invention relates to video coding system. In particular, the present invention relates to method and apparatus for implementation of in-loop filtering associated with a video encoder or decoder.

BACKGROUND

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artifacts are introduced, particularly in the quantization process. In order to alleviate the coding artifacts, additional processing has been applied to reconstructed video to enhance picture quality in newer coding systems. The additional processing is often configured in an in-loop operation so that the encoder and decoder may derive the same reference pictures to achieve improved system performance.

In the High Efficiency Video Coding (HEVC) standard being developed, Deblocking Filter (DF), Sample Adaptive Offset (SAO) and Adaptive Loop Filter (ALF) have been developed to enhance picture quality. The in-loop filter information may have to be incorporated in the bitstream so that a decoder can properly recover the required information. Therefore, in-loop filter information from SAO and ALF is usually provided to entropy encoder for incorporation into the bitstream. In HEVC, DF is applied to the reconstructed video, where the horizontal deblocking filter is first applied to the reconstructed video data across vertical block boundaries and the vertical deblocking filter is then applied to the horizontally DF-processed (also referred as H-DF-processed or horizontal-deblocked) video data across horizontal block boundaries. After both horizontal DF and vertical DF filtering are applied, the fully DF-processed video data is processed by SAO. ALF is then applied to the SAO-processed video data. While the loop processing order for HEVC is from DF to SAO, and then to ALF, the processing order maybe different among various loop filters in other video systems.

FIG. 1 illustrates an exemplary adaptive video coding system incorporating in-loop processing. The video bitstream is decoded by Video Decoder 142 to recover the transformed and quantized residues, SAO/ALF information and other system information. The coded residues are processed by Inverse Quantization (IQ) 124 and Inverse Transformation (IT) 126 to recover the residues. The recovered residues are then added back to prediction data 136 at Reconstruction (REC) 128 to form reconstructed video data. Depending on whether the underlying video data is coded in an Intra mode or Inter mode, a switch 114 selects the prediction data from either the Intra prediction block 110 or the Motion Compensation (MC) block 113. The reconstructed video is further processed by DF 130 (deblocking filter), SAO 131 and ALF 132 to produce the final enhanced decoded video. The enhanced and reconstructed video data is stored in Reference Picture Buffer 134 and used for prediction of other frames.

The coding process in HEVC is applied according to Largest Coding Unit (LCU). The LCU is adaptively partitioned into coding units using quadtree. In each leaf CU, DF is performed for each 8×8 block and in HEVC Test Model Version 4.0 (HM-4.0), the DF is applies to 8×8 block boundaries. For each 8×8 block, horizontal filtering across vertical block boundaries is first applied, and then vertical filtering across horizontal block boundaries is applied. For generality, the coding process may divide a picture into image units and selects coding parameters adaptively for each image unit, where the image unit may be an LCU, a macroblock, a slice, a tile, or other image structure. During processing of a luma block boundary, n pixels of each side are involved in filter parameter derivation, and up to m pixels on each side may be changed after filtering. For HEVC, n is set to 4 for the luma component. For horizontal filtering across vertical block boundaries, reconstructed pixels (i.e., pre-DF pixels) are used for filter parameter derivation and also used as source pixels for filtering. In FIG. 1, deblocking 130 is shown as the first in-loop filtering applied to the reconstructed video data. Nevertheless, a video system may process the reconstructed video data to generate processed reconstructed video data before deblocking is applied. In this case, the deblocking is applied to the processed reconstructed video data. In this disclosure, the pre-DF video data refers to the video data immediately before the DF process, which may be the reconstructed video data or the processed reconstructed video data. For convenience, the term for the reconstructed video data also includes the processed reconstructed video data in this disclosure.

FIG. 2A illustrates an example of a vertical block boundary 210 with n (n=4) boundary pixels on each side of the block boundary. The n boundary pixels on the right side are designated as $q_0$, $q_1$, $q_2$ and $q_{n-1}$, where $q_0$ is the pixel immediate next to the boundary. The n (n=4) boundary pixels on the left side are designated as $p_0$, $p_1$, $p_2$ and $p_{n-1}$, where $p_0$ is the pixel immediate next to the boundary. For horizontal filtering across vertical block boundaries, reconstructed pixels (i.e., pre-DF pixels) are used for filter parameter derivation, and horizontal-deblocked pixels (i.e. pixels after horizontal filtering) are used for vertical filtering. FIG. 2B illustrates an example of a horizontal block boundary 220 with n boundary pixels on each side of the block boundary. The n boundary pixels on the lower side are designated as $q_0$, $q_1$, $q_2$ and $q_{n-1}$, where $q_0$ is the pixel immediate next to the boundary. The n (n=4) boundary pixels on the upper side are designated as $p_0$, $p_1$, $p_2$ and $p_{n-1}$, where $p_0$ is the pixel immediate next to the boundary. While n pixels on each side of the block boundary are used for filter parameter derivation and filtering operation, deblocking only alters m pixels on each side of the block boundary, where m is equal to or smaller than n. In HEVC, m is set to 3 for the luma component. Accordingly, only boundary pixel ($q_0$ to $q_{m-1}$) or ($p_0$ to $p_{m-1}$) may be altered after DF filtering. For DF processing of a chroma block boundary, two pixels (i.e., n=2) on each side, i.e., ($p_0$, $p_1$) or ($q_0$, $q_1$), are involved in filter parameter derivation, and at most one pixel (i.e., m=1) on each side i.e., $p_0$ or $q_0$, may be altered after filtering. For horizontal filtering across vertical block boundaries, reconstructed pixels are used for filter parameter derivation and are used as source pixels for filtering. For vertical filtering across horizontal block boundaries, horizontal DF processed intermediate pixels (i.e. pixels after horizontal filtering) are used for filter parameter derivation and also used as source pixels for filtering.

Sample Adaptive Offset (SAO) 131 is also adopted in HM-4.0, as shown in FIG. 1. SAO is regarded as a special case of filtering where the processing only applies to one pixel. SAO can divide one picture into multiple LCU-aligned regions, and each region can select one SAO type among two Band Offset (BO) types, four Edge Offset (EO) types, and no processing (OFF). For each to-be-processed (also called to-be-filtered) pixel, BO uses the pixel intensity to classify the pixel into a band. The pixel intensity range is equally divided into 32 bands, as shown in FIG. 3. After pixel classification, one offset is derived for all pixels of each band, and the offsets of center 16 bands or outer 16 bands are selected and coded. In SAO, pixel classification is first done to classify pixels into different groups (also called categories or classes). The pixel classification for each pixel is based on a 3×3 window, as shown in FIG. 4 where four configurations corresponding to 0°, 90°, 135°, and 45° are used for classification. Upon classification of all pixels in a picture or a region, one offset is derived and transmitted for each group of pixels. In HM-4.0, SAO is applied to luma and chroma components, and each of the luma components is independently processed. Similar to BO, one offset is derived for all pixels of each category except for category 0, where Category 0 is forced to use zero offset. Table 1 below lists the EO pixel classification, where "C" denotes the pixel to be classified.

TABLE 1

| Category | Condition |
|---|---|
| 1 | C < two neighbors |
| 2 | C < one neighbor && C == one neighbor |
| 3 | C > one neighbor && C == one neighbor |
| 4 | C > two neighbors |
| 0 | None of the above |

Adaptive Loop Filtering (ALF) 132 is another in-loop filtering in HM-4.0 to enhance picture quality, as shown in FIG. 1. Multiple types of luma filter footprints and chroma filter footprints are used. For example, an 11×5 cross shaped filter is shown in FIG. 5A and a 5×5 snow-flake shaped filter is shown in FIG. 5B. Each picture can select one filter shape for the luma signal and one filter shape for the chroma signal. In HM-4.0, up to sixteen luma ALF filters and at most one chroma ALF filter can be used for each picture. In order to allow localization of ALF, there are two modes for luma pixels to select filters. One is a Region-based Adaptation (RA) mode, and the other is a Block-based Adaptation (BA) mode. In addition to the RA and BA for adaptation mode selection at picture level, Coding Units (CUs) larger than a threshold can be further controlled by filter usage flags to enable or disable ALF operations locally. As for the chroma components, since they are relatively flat, no local adaptation is used in HM-4.0, and the two chroma components of a picture share a (the?) same filter.

The RA mode simply divides one luma picture into sixteen regions. Once the picture size is known, the sixteen regions are determined and fixed. The regions can be merged, and one filter is used for each region after merging. Therefore, up to sixteen filters per picture are transmitted for the RA mode. On the other hand, the BA mode uses edge activity and direction as properties for each 4×4 block. Calculating properties of a 4×4 block may require neighboring pixels. For example, a 5×5 window 610 is used for an associated 4×4 window 620 in HM-4.0 as shown in FIG. 6. After properties of 4×4 blocks are calculated, the blocks are classified into fifteen categories. The categories can be merged, and one filter is used for each category after merging. Therefore, up to fifteen filters are transmitted for the BA mode.

In the exemplary decoder implementation for HM-4.0 as shown in FIG. 1, the decoding process is divided into two parts. One is LCU-based processing including Intra prediction (IP) 110, Motion Compensation (MC) 113, Inverse Transform (IT) 126, Inverse Quantization (IQ), and Reconstruction (REC) 128, and the other is picture-based processing including DF 130, SAO 131, and ALF 132. Entropy decoding (ED) 142 belongs to the picture-based processing when SPS, PPS, or slice-level syntax elements are parsed and ED 142 belongs to the LCU-based processing when syntax elements of LCUs are parsed. In PC-based software environment, picture-based processing is easier to implement than LCU-based processing for DF, SAO, and ALF. However, if decoder implementation is in hardware or embedded software, picture-based processing would require picture buffers, which results in high system cost due to on-chip picture buffers. On the other hand, the use of off-chip picture buffers will significantly increases system bandwidth due to external memory access. Furthermore, power consumption and data access latency will also increase accordingly. Therefore, it is preferred to implement DF, SAO, and ALF using LCU-based decoding configuration.

When LCU-based processing is used for DF, SAO, and ALF, the encoding and decoding process can be done LCU by LCU in a raster scan order for parallel processing of multiple LCUs. In this case, line buffers are required for DF, SAO, and ALF because processing one LCU row requires pixels from the upper LCU row. If off-chip line buffers (e.g. DRAM) are used, it will result in substantial increase in external memory bandwidth and power consumption. On the other hand, if on-chip line buffers (e.g. SRAM) are used, the chip area will increase and accordingly the chip cost will increase. Though line buffers for LCU-based processing are already much smaller than picture buffers, it is desirable to further reduce line buffers to reduce cost.

FIG. 7 illustrates an example of line buffer requirement for processing luma component associated with DF, SAO, and ALF in an LCU-based encoding or decoding system. Bold lines 710 and 712 indicate horizontal and vertical LCU boundaries respectively, where the current LCU is located in the upper side of the horizontal LCU boundary 710 and the right side of the vertical LCU boundary 712. Pixel lines A through J are first processed by horizontal DF and then by vertical DF. For convenience, a pixel line X is referred to as a line X. Horizontal DF processing for lines K through N above the horizontal LCU boundary 710 needs to wait until the four lines below the horizontal LCU boundary become available. The horizontal filtering for lines K through N can be delayed until the lower LCU becomes available in order to avoid line buffers for the horizontal-deblocked pixels. Therefore, four lines (i.e., line K through N) of pre-DF pixels (i.e., reconstructed pixels) have to be stored for DF to be performed at a later time. The pre-DF pixels refer to reconstructed pixels that are not yet processed by DF at all. Accordingly, in a typical system, four (n=4) lines (lines K through N) are used to store pre-DF pixels for subsequent DF processing. Based on the system configuration shown in FIG. 1, SAO is then applied to DF output pixels. Since DF has processed lines A through J, SAO can process lines A through I. The SAO processing can be applied up to DF output line I since the SAO processing with the EO type is based on a 3×3 window as indicated by box 730. The 3×3 window for line J will require DF output pixels for line K, which is not available yet. After SAO processes lines A through I, the properties for a 4×4 block 740 still cannot be calculated since line J is not yet processed by SAO. Therefore, ALF can only process lines A through F at this time. ALF processing using the 5×5 snowflake filter for line F is shown in FIG. 7, where the filter footprint 750 for an underlying pixel 752 is shown. After this point, no further processing can be done for the current LCU until the lower LCU becomes available.

When the lower LCU becomes available, lines K through N of the current LCU (after the lower LCU arrives, the LCU located at the upper-right quadrant of LCU boundaries 710 and 712 is still referred as the "current LCU") are read from line buffers and processed by horizontal DF to generate horizontal-deblocked lines K through N. Horizontal DF processing can be applied to reconstructed lines of the neighboring LCU below. Only two lines (lines O and P) of the neighboring LCU below are shown to illustrate the in-loop processing of reconstructed video data above the bottom LCU boundary line 710. Vertical DF processing is applied to the horizontal-deblocked lines K through N. Vertical DF processing operates on four boundary pixels associated with lines K through N of the current LCU is indicated by box 720 as one example in FIG. 7. After lines K through N are processed by vertical DF, lines J through P can be processed by SAO. When SAO processes line J, line I is required for determining the EO classification. Therefore, two lines (i.e., lines I and J) of DF output pixels have to be stored in line buffers for SAO. Next, the properties of 4×4 block for lines G through P can be calculated and lines G through P can be filtered by ALF accordingly. When line G is processed by ALF, it requires SAO processed pixel data from lines E to I. Through further analysis, it can be shown that five lines (i.e., lines E through I) of SAO output pixels have to be stored in line buffers for ALF. Accordingly, the total in-loop filtering requires 11 luma line buffers (4 pre-DF lines, 2 DF-processed lines and 5 SAO processed lines).

FIG. 8 illustrates an example of chroma line buffer requirement associated with DF, SAO, and ALF for LCU-based decoding. Bold lines 810 and 812 indicate horizontal and vertical LCU boundaries respectively, where the current LCU is located on the upper side of the horizontal LCU boundary 810 and the right side of the vertical LCU boundary 812. When the current LCU is processed, lines A through L are first processed by DF. However, lines M through N cannot be vertically filtered by DF because the lower LCU is not yet available and DF needs two horizontal-deblocked lines below the horizontal boundary 810. Similar to the case of luma in-loop processing, the horizontal filtering for lines M and N is delayed until the lower LCU becomes available in order to avoid buffering of horizontal-deblocked video data. Accordingly, two lines (i.e., lines M and N) of pre-DF video data (i.e., reconstructed video data) need to be stored for DF. SAO is applied on DF output pixels, and the processing for each pixel is based on a 3×3 window as illustrated by box 820 in FIG. 8. Since DF has processed lines A through L, SAO can process lines A through K. After SAO processes lines A through K, ALF can process lines A through I. Since a 5×5 snowflake filter is used, ALF cannot process lines beyond line I as indicated by the filter footprint 830 for an underlying pixel 832 in line I. After this point, no further process can be done for the current LCU until the lower LCU becomes available. When the lower LCU arrives, lines M through P are first processed by DF, and then lines L through P are processed by SAO. Only two lines (lines O and P) of the neighboring LCU below are shown to illustrate the in-loop processing of reconstructed video data above the bottom LCU boundary line 810. When SAO processes line L, the neighboring line K is required. Therefore, two lines (i.e., line K and L) of DF output pixels have to be stored for SAO. After lines L through P are processed by SAO, lines J through P can be filtered by ALF. When line J is filtered, it requires neighboring lines H through L. Through further analysis, it can be shown that four lines (i.e., line H through K) of SAO output pixels have to be stored in the line buffers for ALF. Accordingly, the total in-loop filtering requires eight chroma line buffers.

In the above analysis of an exemplary coding system, it is shown that the line buffer requirement of DF, SAO and ALF processing for the luma and chroma components are 11 and 8 lines respectively. For HDTV signals, each line may have nearly two thousand pixels. The total line buffers required for the system becomes sizeable. It is desirable to reduce the required line buffers for in-loop processing.

BRIEF SUMMARY OF THE INVENTION

A method and apparatus for in-loop processing of reconstructed video are disclosed. The reconstructed video data is partitioned into image units. The image unit corresponds to a Largest Coding Unit (LCU), a slice, or a tile. Horizontal deblocking is applied to the reconstructed video data across vertical image-unit boundaries and then vertical deblocking operates on n pixels of horizontal-deblocked video data on each side of horizontal image-unit boundaries. According to various embodiments of the present invention, the horizontal deblocking is applied to at least one of said n reconstructed lines to generate at least a horizontal-deblocked line for line $p_{n-1}$. Sample adaptive offset (SAO) processing is then applied to at least a horizontal-deblocked line for line $p_n$ based on the horizontal-deblocked line for line $p_n$-1. The above steps are performed before a neighboring image unit below the current image unit arrives.

In one embodiment, the method further comprises storing one line $p_n$ of deblocking filter (DF) output pixels for applying SAO processing on line $p_{n-1}$ when the neighboring image unit below the current image unit arrives. In another embodiment, the method further comprises storing said n horizontal-deblocked lines in one or more line buffers and then reading back for applying the vertical deblocking to said n horizontal-deblocked lines when the neighboring image unit below the current image unit is arrived.

In yet another embodiment of the present invention, at least line $p_0$ of said n reconstructed lines is not horizontal deblocked before the neighboring image unit below the current image unit arrives. The method may further comprise storing said reconstructed line for line p0 in a line buffer, reading said reconstructed line for line p0 from said line buffer, and performing Intra prediction based on said reconstructed line for line p0 and coded data for the neighboring image unit below the current image unit to generate reconstructed video for the neighboring image unit below the current image unit. Alternatively, the method may further comprise applying the horizontal deblocking, after said performing Intra prediction, to said reconstructed line for line $p_0$ to generate one horizontal-deblocked line for line $p_0$ and applying the vertical deblocking to said one horizontal-deblocked line for line $p_0$.

DETAILED DESCRIPTION OF THE INVENTION

Figure 9:
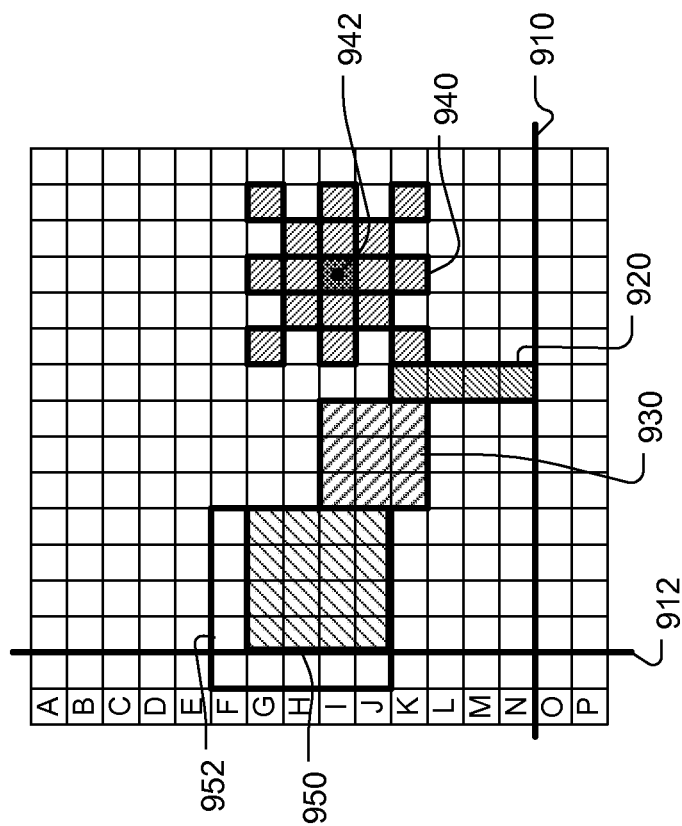
FIG. 9 illustrates an example of line buffer requirement for processing luma component associated with DF, SAO, and ALF in an LCU-based encoding or decoding system according to an embodiment of the present invention.

FIG. 9 illustrates an example of processing flow according to an embodiment of the present invention, where the luma line buffers required for DF, SAO, and ALF with LCU-based decoding are shown. A given current LCU is located at the upper right quadrant of the horizontal LCU boundary 910 and vertical LCU boundary 912. Lines A through J are first processed by horizontal DF and then by vertical DF. As mentioned before, the horizontal DF for lines K through N is delayed until the lower LCU arrives in order to avoid line buffers of horizontal-deblocked pixels for the vertical DF for lines K through N. Therefore, four lines (lines K through N) of pre-DF pixels are stored for DF processing when the lower LCU becomes available. Next, SAO is ready to apply to DF output pixels. Since the vertical DF for lines K through N will not change line K, horizontal DF can be additionally applied to line K (i.e., boundary line $p_{n-1}$). Accordingly, SAO can be additionally applied to line J, as illustrated by the 3×3 window 930 due to the availability of the additional DF-processed line K. When horizontal DF is applied to line K, the horizontal-deblocked output pixels of line K will not be stored in the line buffers in order to save line buffers. When the horizontal-deblocked pixels of line K is needed for vertical DF process, the horizontal-deblocked pixels of line K can be generated again. This is not an issue for hardware based implementation. After SAO processes lines A through J, the 4×4 block properties, as illustrated by the 4×4 window 950, can be calculated based on the 5×5 window 952. At this moment, ALF can process lines A through H. After this, no further process can be done for the current LCU until the lower LCU becomes available.

Figure 1:
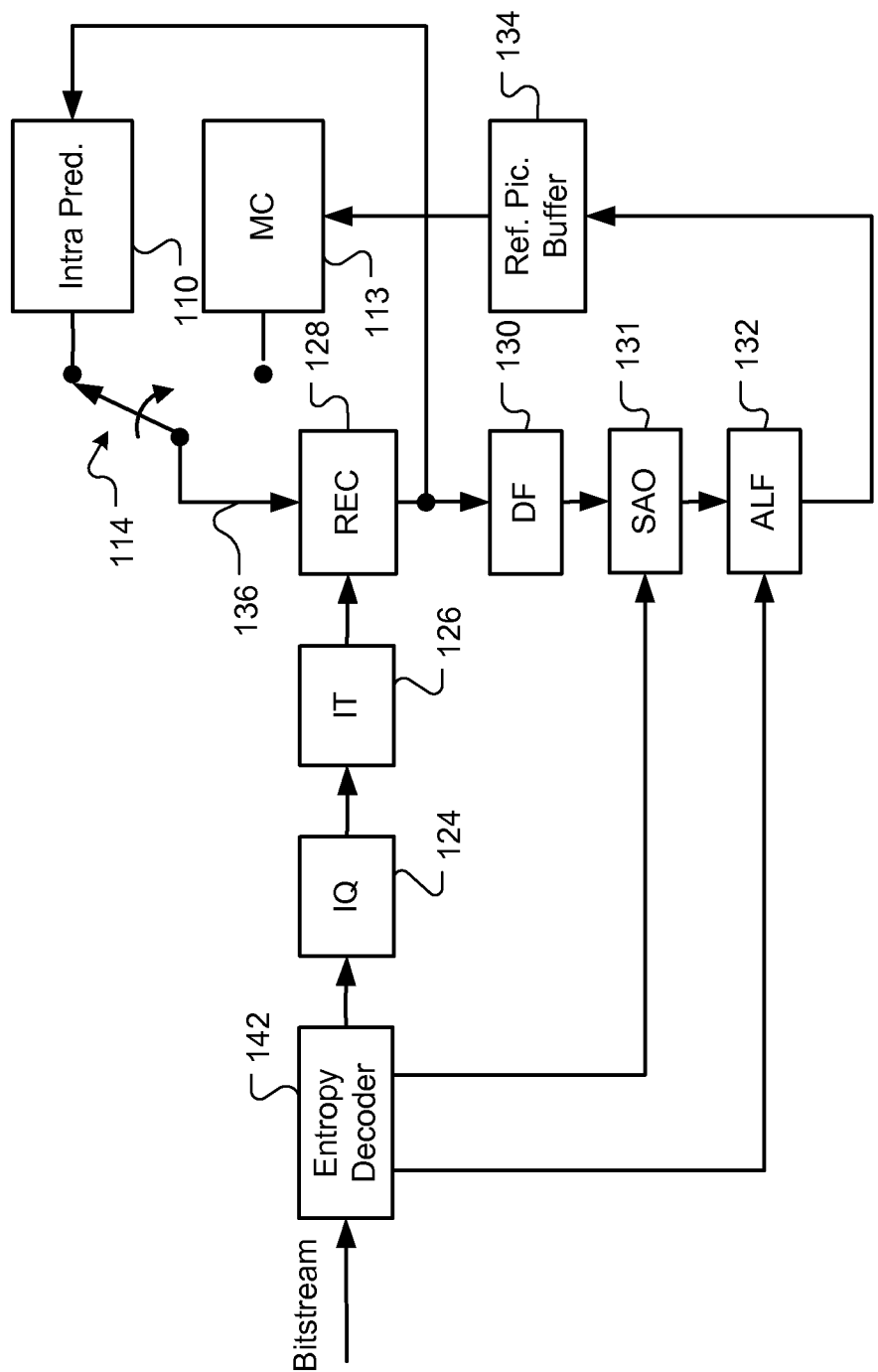
FIG. 1 illustrates an exemplary adaptive video coding system incorporating DF, SAO and ALF in-loop processing.
Figure 2B:
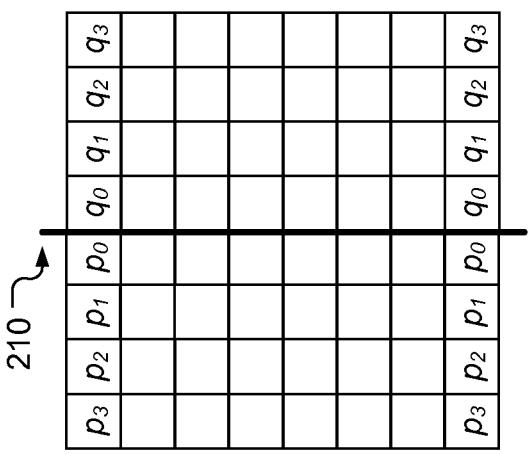
FIG. 2B illustrates an example of a horizontal block boundary with 4 boundary pixels on each side of the block boundary.
Figure 2A:
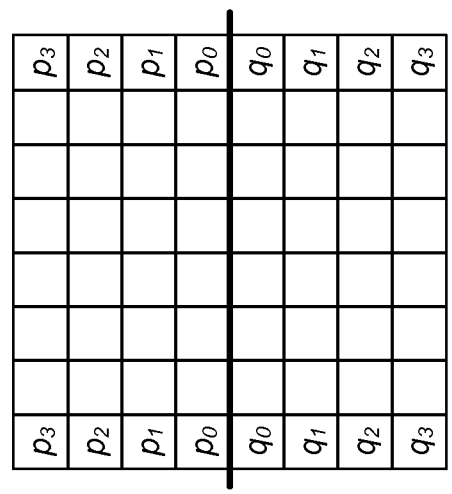
FIG. 2A illustrates an example of a vertical block boundary with 4 boundary pixels on each side of the block boundary.
Figure 3:
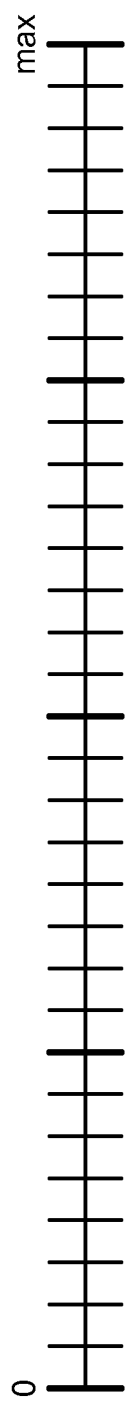
FIG. 3 illustrates an example of Band Offset (BO) in Sample Adaptive Offset (SAO) by equally dividing the pixel intensity range into 32 bands.
Figure 4:
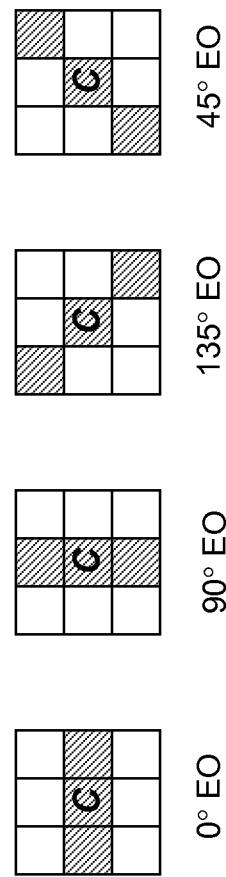
FIG. 4 illustrates Edge Offset (EO) pixel classification in Sample Adaptive Offset (SAO) based on a 3×3 window, with four configurations corresponding to 0°, 90°, 135°, and 45°.
Figure 5B:
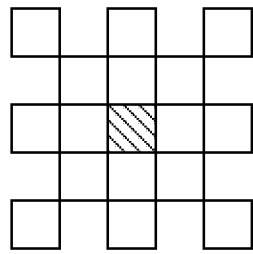
FIG. 5B illustrates a 5×5 snow-flake shaped filter for Adaptive Loop Filter (ALF).
Figure 5A:
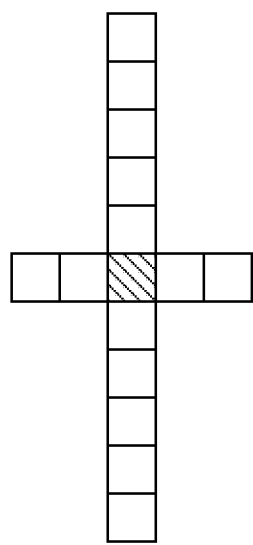
FIG. 5A illustrates an 11×5 cross shaped filter for Adaptive Loop Filter (ALF).
Figure 6:
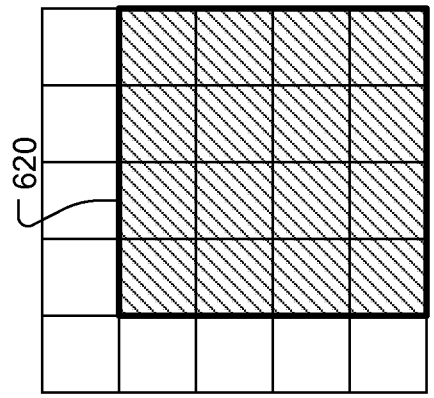
FIG. 6 illustrates an example of Block-based Adaptation (BA) mode Adaptive Loop Filter (ALF) using a 4×4 BA window with a 5×5 supporting window.

When the lower LCU arrives, lines K through P are first processed by DF and then by SAO. The horizontal DF is applied to the bottom three lines (i.e., lines L through N) of the current LCU (after the lower LCU arrives, the LCU located at the upper-right quadrant of LCU boundaries 910 and 912 is still referred as the "current LCU") and then the vertical DF (as indicated by box 920 as one example) can be applied to the horizontal-deblocked pixels. When SAO processes line K, line J is required as indicated by the 3×3 window 930. Therefore, one line (i.e., line J) of DF output pixels has to be stored for SAO. Next, the 4×4 block properties for lines I through P are calculated. Finally, lines I through P can be filtered by ALF. When line I is filtered by ALF, it requires lines G through K, as illustrated by the filter footprint 940 for underlying pixel 942. However, calculating properties for the 4×4 block (indicated by window 950) associated with lines I and J needs SAO processed data for lines F through J as indicated by window 952. Therefore, five lines (i.e., line F through J) of SAO output pixels have to be stored for ALF. Accordingly, the total in-loop filtering requires ten luma line buffers, which is one line buffer less than the method associated with FIG. 7. Since the Intra luma prediction already stores one line (i.e., line N) of pre-DF pixels, this luma line buffer corresponds to boundary pixel line $p_0$ and can be shared with in-loop filtering. When the coded data for the LCU below arrives, the residues for the LCU below can be recovered using the Entropy decoder 142 as shown in FIG. 1. For Intra coded video data, the reconstructed video data for the LCU below can be recovered based on reconstructed line $p_0$ and the recovered residues for the LCU below. While it is not explicitly described, it is understood that Intra prediction decoding for the LCU below may also require reconstructed data immediately adjacent to the left LCU boundary of the LCU below. Furthermore, if a filter index line buffer is used to store BA mode filter selections for lines G through J, there is no need for computing the block properties again during filtering of lines I through J. In this way, one line (i.e., line F) of SAO output pixels can be saved for ALF. The filter index line buffer requires only 4 bits per 4×4 block, which is only about 10% in comparison with the pixel line buffer.

In the above example, one line (i.e., line J) of DF output pixels has to be stored in line buffers for SAO. The DF output pixels are stored for EO classification. An example of EO classification based on HEVC HM4.0 is shown in Table 1, where the center pixel value is compared with two neighboring pixel values. In other words, the EO classification can be determined according to the sign of the difference between the center pixel value and a respective neighboring pixel value. Therefore, partial derived information instead of actual pixel value can be stored. In the above example, the sign information (partial derived information) between line J and line I can be stored instead of the DF-processed pixel values for line J. Depending on the specific in-loop filters used, partial derived information can be determined Furthermore, depending on the underlying in-loop filter, the partial derived information may be derived from reconstructed video data, horizontal-deblocked video data, fully DF processed data, or SAO processed data.

The above example illustrates one embodiment where horizontal DF is applied to line K (i.e., the pixel line corresponding to $p_{n-1}$) before arrival of the lower LCU so that SAO can be applied to one more line (i.e., line J). Subsequently, the block properties associated with lines G to J can be determined and the ALF can be applied to lines A through H before the LCU below arrives. In this example, four (n=4) pixels are involved in filter parameter derivation and filtering operation and three (m=3) pixels are processed by DF. Therefore, only one pixel (n−m=1) on each side of the LCU boundary is not processed (i.e., $p_{n-1}$ or $q_{n-1}$). The above embodiment can be extended to DF with more pixels un-changed by DF (n−m>1). Furthermore, while specific in-loop filter information and parameters are used for DF, SAO and ALF to illustrate detailed steps to practice embodiments of the present invention, the specific information and parameters shall not be construed as limitations of the present invention. A skilled person in the art may practice the present invention in coding systems with other in-loop filter information and parameters.

Figure 10:
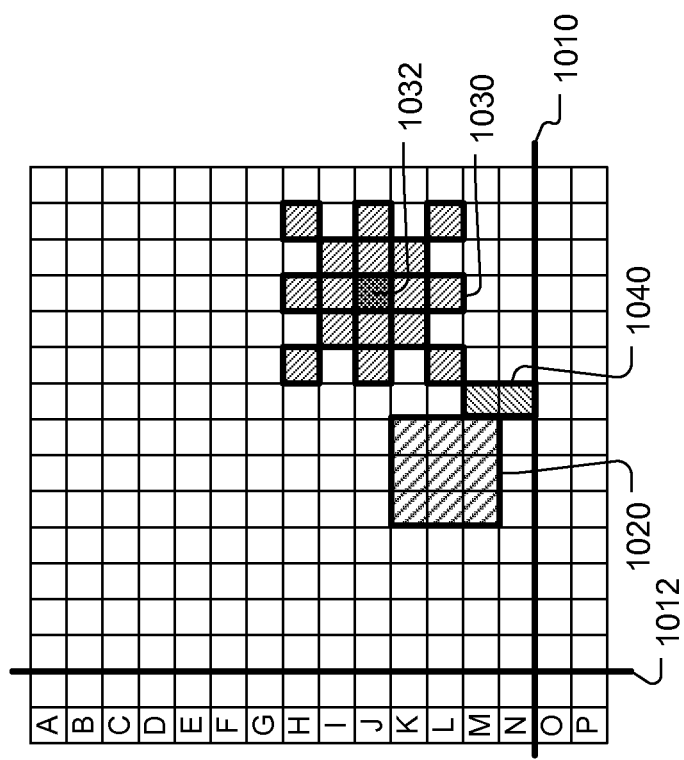
FIG. 10 illustrates an example of line buffer requirement for processing chroma component associated with DF, SAO, and ALF in an LCU-based encoding or decoding system according to an embodiment of the present invention.

FIG. 10 illustrates an example of processing flow according to an embodiment of the present invention, where the chroma line buffers required for DF, SAO, and ALF with LCU-based decoding are shown. For a given current LCU with lower horizontal LCU boundary 1010 and left vertical LCU boundary 1012, lines A through M are first processed by horizontal DF, and then lines A through L are processed by vertical DF. Since the vertical DF for lines M through N will not change line M, horizontal-deblocked pixels of line M are also the DF output pixels of line M. An advantage of applying horizontal deblocking to line M at this time is to allow SAO to process an additional line, i.e., line L. Since the DF-processed line M is available, SAO classification based on a 3×3 window as indicated by the box 1020 in FIG. 10 can be performed for line L. An embodiment according to the present invention delays the horizontal DF for line N until the lower LCU arrives in order to share the line buffer of pre-DF pixels of line N with Intra chroma prediction. As for the vertical DF for lines M through N, it has to wait for the lower LCU. After SAO is applied to lines A through L, ALF can be applied to lines A through J. Line J is as far as ALF can process for the 5×5 filter footprint 1030 for an underlying pixel 1032 as shown in FIG. 10. After this, no further processing can be done for the current LCU until the lower LCU arrives.

When the lower LCU becomes available, lines N through P are first processed by horizontal DF, and then lines M through P are processed by vertical DF, where the vertical DF processing for two pixels above horizontal boundary 1010 are indicated by box 1040. SAO can be applied to DF processed pixels. When SAO is applied to line M, line L is required in order to provide data for SAO classification based on a 3×3 window. However, line L has been processed by SAO and the DF outputs for line L are not available any more. Therefore, one line (i.e., line L) of DF output pixels has to be buffered for SAO. Finally, lines K through P can be filtered by ALF. When line K is processed by ALF, it requires lines I through M. Through further analysis, it can be determined that four lines (lines I through L) of SAO output pixels have to be stored for ALF. Accordingly, the total in-loop filtering requires seven chroma line buffers.

Figure 7:
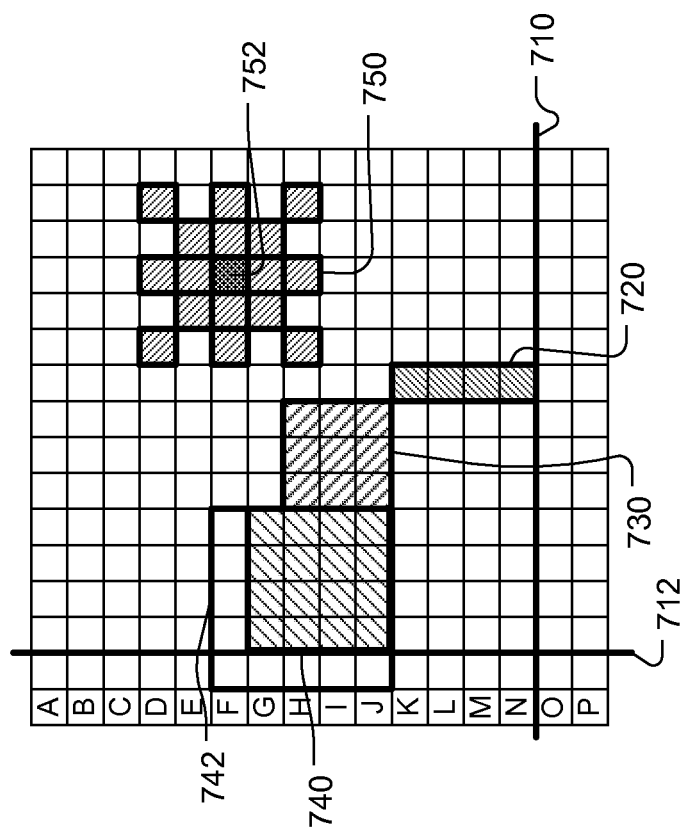
FIG. 7 illustrates an example of line buffer requirement for processing luma component associated with DF, SAO, and ALF in an LCU-based encoding or decoding system.
Figure 8:
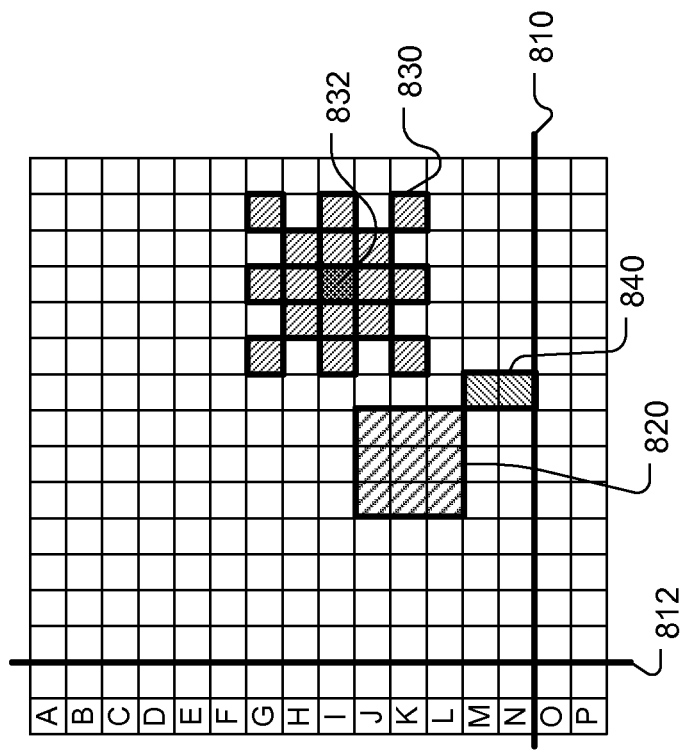
FIG. 8 illustrates an example of line buffer requirement for processing chroma component associated with DF, SAO, and ALF in an LCU-based encoding or decoding system.

In yet another embodiment of the present invention, after horizontal DF for lines K through N, four lines (i.e., lines K through N) of horizontal-deblocked output pixels are stored in line buffers to wait for vertical DF. When the lower LCU becomes available, the horizontal-deblocked lines K through N are read back from the line buffers and the vertical DF can be applied to lines K through N. While this embodiment makes the DF signal flow more straightforward, the line buffers cannot be shared by the Intra prediction anymore. The Intra prediction operates on pre-DF video data. However, the line buffers store horizontal-deblocked video data. In order to overcome this issue, yet another embodiment is disclosed. According to this embodiment, lines A through M are processed by horizontal DF. Horizontal-deblocked pixels of lines K through M and pre-DF pixels of line N are stored in line buffers. Lines A through J are then processed by vertical DF. SAO and ALF processing can be based on conventional methods as shown in FIGS. 7 and 8, or based on methods embodying the present invention as shown in FIGS. 9 and 10. When the lower LCU arrives, pre-DF pixels of line N can be read back from the line buffers and used for Intra luma prediction along with coded data from the LCU below. The reconstructed line N can then be processed by horizontal DF. Horizontal-deblocked pixels of lines K through M are read back from the line buffers and lines K through P can be processed by vertical DF. SAO and ALF processes can be based on conventional methods as shown in FIGS. 7 and 8, or based on methods embodying the present invention as shown in FIGS. 9 and 10.

In yet another embodiment of the present invention, horizontal DF for lines above a horizontal LCU boundary is delayed for lines $p_0$ to $p_{k-1}$, where $1<k<n$. The pre-DF pixels for lines $p_0$ to $p_{k-1}$, are stored in line buffers for horizontal DF processing. On the other hand, horizontal DF is applied to lines from $p_k$ to $p_{n-1}$ and the horizontal-deblocked outputs for lines from $p_k$ to $p_{n-1}$ are stored in line buffers. In this case, pre-DF pixels for line $p_0$ are buffered and this line buffer can be shared with the line buffer required for Intra prediction.

In another embodiment of the present invention, the horizontal DF is delayed for a portion of line $p_0$ and a portion of reconstructed line $p_0$ is stored in a line buffer. When the coded data for the LCU below arrives, the residues of the LCU below can be recovered. The portion of the reconstructed line $p_0$ is read back from the line buffer and is used with the residues of the LCU below to generate at least one portion of reconstructed video for the neighboring image unit below the current image unit.

For the case when not all lines above a horizontal LCU boundary are horizontally filtered before the arrival of the lower LCU, filter decision information such as ON/OFF decision or Strong/Weak filter decision can be stored for filtering lines of the lower LCU (n lines below the horizontal LCU boundary).

The line buffers mentioned above can be implemented using on-chip storage devices such as Static Random Access Memory (SRAM) to reduce system bandwidth and power associated with off-chip memory. The line buffers may be implemented using one integrated memory device or multiple memory devices to practice the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for in-loop processing of reconstructed video data, wherein the reconstructed video data is partitioned into image units, horizontal deblocking is applied to the reconstructed video data across vertical image-unit boundaries and then vertical deblocking operates on n pixels of horizontal-deblocked video data on each side of horizontal image-unit boundaries, and vertical filter parameters of the vertical deblocking are derived based on n horizontal-deblocked lines on each side of the horizontal image-unit boundaries, wherein n is a first integer, the method comprising:
receiving the reconstructed video data for a current image unit, wherein the reconstructed video data includes n reconstructed lines from line $p_0$ to line $p_{n-1}$ above a horizontal image-unit boundary and line $p_0$ is closest to the horizontal image-unit boundary;
applying the horizontal deblocking to at least one of said n reconstructed lines to generate at least one horizontal-deblocked line for line $p_{n-1}$; and
applying sample adaptive offset (SAO) processing to at least one horizontal-deblocked line for line $p_n$ based on the horizontal-deblocked line for line $p_{n-1}$; and
wherein the above steps are performed before a neighboring image unit below the current image unit arrives.

2. The method of claim 1, further comprising:
storing one line $p_n$ of deblocking filter (DF) output pixels for applying SAO processing on line $p_{n-1}$ when the neighboring image unit below the current image unit arrives.

3. The method of claim 1, wherein all of said n reconstructed lines are horizontal deblocked before the neighboring image unit below the current image unit arrives, the method further comprises:
storing said n horizontal-deblocked lines in one or more line buffers;
reading said n horizontal-deblocked lines from said one or more line buffers; and
applying the vertical deblocking to said n horizontal-deblocked lines when the neighboring image unit below the current image unit arrives.

4. The method of claim 1, wherein the image unit corresponds to a Largest Coding Unit (LCU), a slice, or a tile.

5. The method of claim 1, wherein at least line $p_0$ of said n reconstructed lines is not horizontal deblocked before the neighboring image unit below the current image unit arrives.

6. The method of claim 5, further comprising:
storing said reconstructed line for line $p_0$ in a line buffer;
reading said reconstructed line for line $p_0$ from said line buffer; and
performing Intra prediction based on said reconstructed line for line $p_0$ and coded data for the neighboring image unit below the current image unit to generate reconstructed video for the neighboring image unit below the current image unit.

7. The method of claim 6, further comprising:
applying the horizontal deblocking, after said performing Intra prediction, to said reconstructed line for line $p_0$ to generate one horizontal-deblocked line for line $p_0$; and
applying the vertical deblocking to said one horizontal-deblocked line for line $p_0$.

8. The method of claim 5, wherein lines $p_0$ to $p_{K-1}$ of said n reconstructed lines are not horizontal deblocked before the neighboring image unit below the current image unit arrives, the method further comprises:
storing said reconstructed lines for lines $p_0$ to $p_{K-1}$ and horizontal-deblocked lines for lines $p_K$ to $p_{n-1}$ in one or more line buffers before the neighboring image unit below the current image unit arrives, wherein 1<K<n, and K is a second integer.

9. The method of claim 5, further comprising storing filter decision information for the horizontal filtering of the current image unit when the neighboring image unit below the current image unit becomes available.

10. The method of claim 5, further comprising storing at least partial derived information associated with at least one portion of one reconstructed line or one horizontal-deblocked line above the horizontal image-unit boundary, wherein said partial derived information is used for the horizontal deblocking or SAO processing, and wherein the horizontal deblocking or SAO processing is applied to said at least one portion of one reconstructed line or one horizontal-deblocked line above the horizontal image-unit boundary when the neighboring image unit below the current image unit becomes available.

11. An apparatus for in-loop processing of reconstructed video data, wherein the reconstructed video data is partitioned into image units, horizontal deblocking is applied to the reconstructed video data across vertical image-unit boundaries and then vertical deblocking operates on n pixels of horizontal-deblocked video data on each side of horizontal image-unit boundaries, and vertical filter parameters of the vertical deblocking are derived based on n horizontal-deblocked lines on each side of the horizontal image-unit boundaries, wherein n is a first integer, the apparatus comprising:
means for receiving the reconstructed video data for a current image unit, wherein the reconstructed video data includes n reconstructed lines from line $p_0$ to line $p_{n-1}$ above a horizontal image-unit boundary and line $p_0$ is closest to the horizontal image-unit boundary;
means for applying the horizontal deblocking to at least one of said n reconstructed lines to generate at least one horizontal-deblocked line for line $p_{n-1}$; and
means for applying sample adaptive offset (SAO) processing on at least one horizontal-deblocked line for line $p_n$ based on the horizontal-deblocked line for line $p_{n-1}$; and
wherein the above steps are performed before a neighboring image unit below the current image unit arrives.

12. The apparatus of claim 11, further comprising:
means for storing one line $p_n$ of deblocking filter (DF) output pixels for applying SAO processing on line $p_{n-1}$ when the neighboring image unit below the current image unit arrives.

13. The apparatus of claim 11, wherein all of said n reconstructed lines are horizontal deblocked before the neighboring image unit below the current image unit arrives, the apparatus further comprises:
- means for storing said n horizontal-deblocked lines in one or more line buffers;
- means for reading said n horizontal-deblocked lines from said one or more line buffers; and
- means for applying the vertical deblocking to said n horizontal-deblocked lines when the neighboring image unit below the current image unit arrives.

14. The apparatus of claim 11, wherein the image unit corresponds to a Largest Coding Unit (LCU), a slice, or a tile.

15. The apparatus of claim 11, wherein at least line $p_0$ of said n reconstructed lines is not horizontal deblocked before the neighboring image unit below the current image unit arrives.

16. The apparatus of claim 15, further comprising:
- means for storing said reconstructed line for line $p_0$ in a line buffer;
- means for reading said reconstructed line for line $p_0$ from said line buffer; and
- means for performing Intra prediction based on said reconstructed line for line $p_0$ and coded data for the neighboring image unit below the current image unit to generate reconstructed video for the neighboring image unit below the current image unit.

17. The apparatus of claim 16, further comprising:
- means for applying the horizontal deblocking, after said performing Intra prediction, to said reconstructed line for line $p_0$ to generate one horizontal-deblocked line for line $p_0$; and
- means for applying the vertical deblocking to said one horizontal-deblocked line for line $p_0$.

18. The apparatus of claim 15, wherein lines $p_0$ to $p_{K-1}$ of said n reconstructed lines are not horizontal deblocked before the neighboring image unit below the current image unit arrives, the apparatus further comprises:
- storing said reconstructed lines for lines $p_0$ to $p_{K-1}$ and horizontal-deblocked lines for lines $p_K$ to $p_{n-1}$ in one or more line buffers before the neighboring image unit below the current image unit arrives, wherein 1<K<n, and K is a second integer.

19. The apparatus of claim 15, further comprising storing filter decision information for the horizontal filtering of the current image unit when the neighboring image unit below the current image unit becomes available.

20. The apparatus of claim 15, further comprising means for storing at least partial derived information associated with at least one portion of one reconstructed line or one horizontal-deblocked line above the horizontal image-unit boundary, wherein said partial derived information is used for the horizontal deblocking or SAO processing, and wherein the horizontal deblocking or SAO processing is applied to said at least one portion of one reconstructed line or one horizontal-deblocked line above the horizontal image-unit boundary when the neighboring image unit below the current image unit becomes available.

* * * * *